United States Patent [19]

Burvee

[11] Patent Number: 4,960,300
[45] Date of Patent: Oct. 2, 1990

[54] HOPPER EXTENSION DEVICE

[76] Inventor: Arvard C. Burvee, Rte. 1, Box 406, Fairmount, N. Dak. 58030

[21] Appl. No.: 442,706

[22] Filed: Nov. 29, 1989

[51] Int. Cl.⁵ .......................................... B62D 33/027
[52] U.S. Cl. ........................................ 296/34; 296/26; 56/202
[58] Field of Search .................... 296/100, 32, 34, 36, 296/26, 27; 56/194, 202

[56] References Cited

U.S. PATENT DOCUMENTS

| | | | |
|---|---|---|---|
| 2,988,368 | 6/1961 | Kerr | 296/32 X |
| 4,095,838 | 6/1978 | Beeler | 296/26 |
| 4,544,196 | 10/1989 | Schmeichel et al. | 296/26 |
| 4,703,971 | 11/1987 | Schmeichel et al. | 296/34 X |

Primary Examiner—Margaret A. Focarino
Assistant Examiner—Gary C. Hoge

[57] ABSTRACT

A hopper extension device for attachment to a conventional combine hopper includes upper and lower rectangular frames which have a flexible wall structure secured thereto. The frame members of the upper and lower frames extend through sleeves at the upper and lower ends of vertical panels defined by the flexible wall structure. The hopper extension device is shiftale between erect and collapsed positions by a plurality of toggle link assemblies, which extend between and are connected to the upper and lower frames. The toggle linkage assemblies are vertically disposed in a locked over-center condition in the erect position and are horizontally disposed in the collapsed position. The panels of the flexible walls extend between the toggle links of each toggle link assembly when the latter are in the collapsed position.

6 Claims, 2 Drawing Sheets

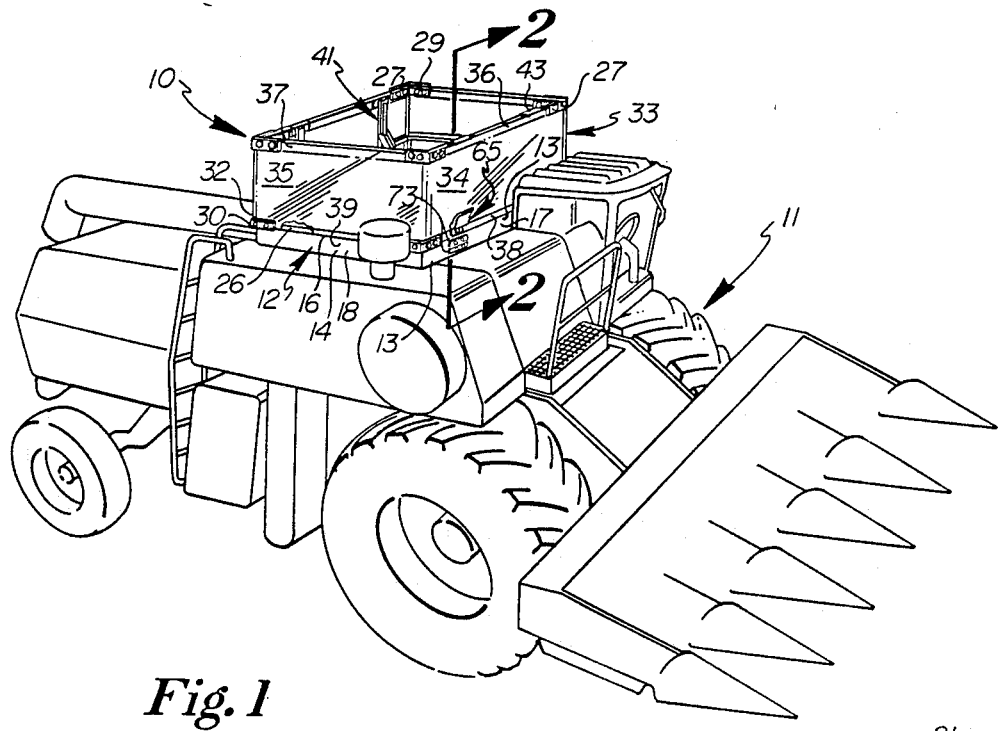
Fig. 1
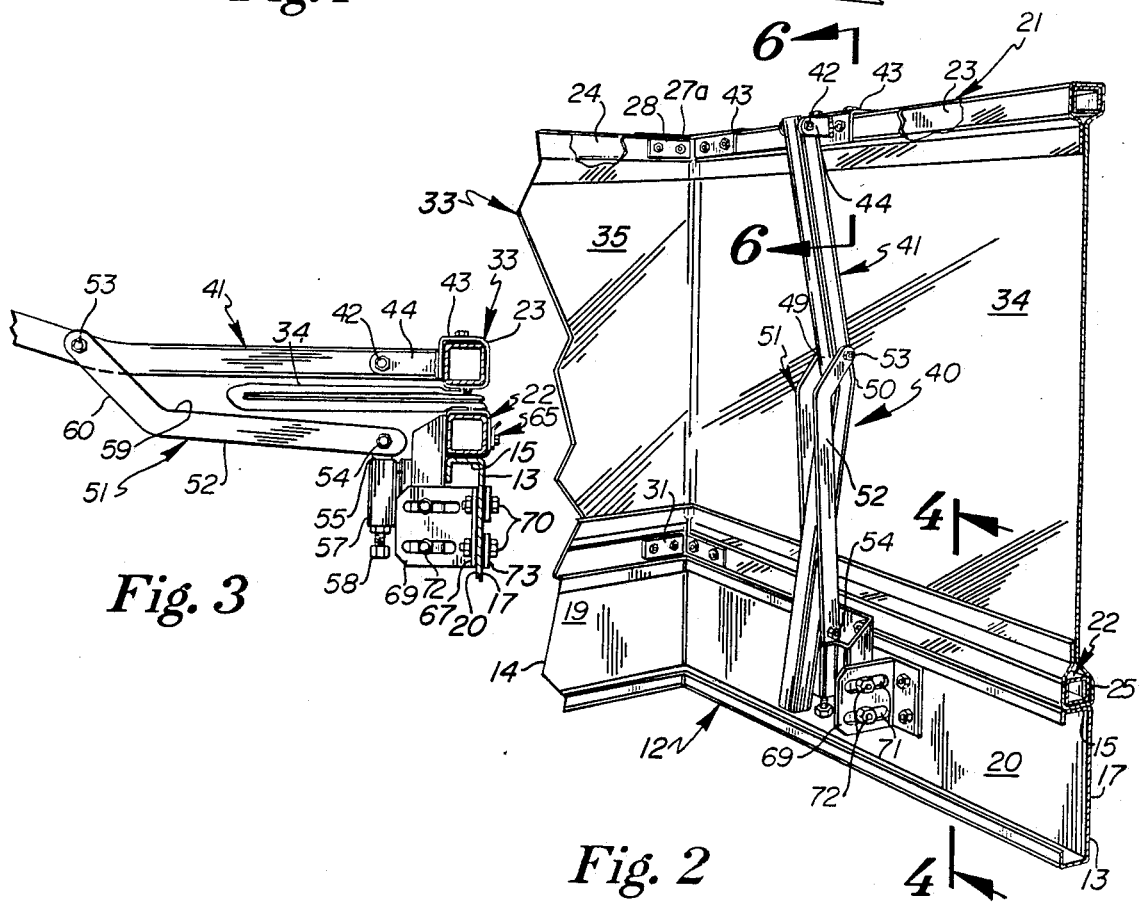
Fig. 3
Fig. 2

HOPPER EXTENSION DEVICE

FIELD OF THE INVENTION

This invention relates to a hopper extension device for grain hoppers of combines.

BACKGROUND OF THE INVENTION

Because of overall design and structural limitations, the grain hoppers of commercial combines also have limited capacity. When the hopper becomes filled, the farmer must empty the contents thereof into a truck before continuing with the harvesting operation. During harvesting, the farmer is often times faced with time constraints because of impending weather conditions. Under such circumstances, farmers would prefer to have combine hoppers with greater capacity to avoid stoppage for unloading the hopper. Unfortunately, there are no attachments for combine hoppers which would increase the capacity thereof.

However, extensions have been provided for increasing the load capacity of truck or trailer bodies. For example, U.S. Pat. No. 4,095,838, to Beeler, discloses an extensible and collapsible extension device for a truck body. Similarly, U.S. Pat. No. 4,544,196, to Schmeichel et al., also discloses an extension attachment for a truck body. In the Schmeichel et al. Patent, the flexible side wall is raised and lowered by toggle linkages, which have to be locked in the extended position, and which is partially detached from the extension device in the collapsed position. Because of their particular construction and manner of operation, neither of these prior art truck body extensions are directly adaptable for use with combine hoppers.

SUMMARY OF THE INVENTION

It is an object of this invention to provide a novel hopper extension device for combine hoppers, which may be attached to the hopper combine for increasing the capacity of the latter, and which may be readily extended and collapsed by an operator.

The hopper extension device includes upper and lower rectangular frames formed of tubular frame members and interconnected by a plurality of over-center toggle linkage assemblies. Frame members of the rectangular frames extend through sleeves of a flexible wall structure, which defines the vertical panels of the hopper extension device when the latter is in an extended position. The toggle linkages are mounted on the inside of the hopper extension and pivot inwardly from a vertical position to a substantially horizontal position when thee hopper extension device is in the collapsed condition. The toggle links of each linkage are shaped to permit the flexible wall defining panels to collapse between each pair of toggle links when the hopper extension is in the collapsed position. While the hopper extension device increases the capacity of the conventional hopper combine, it may be collapsed so that it increases the overall height of the hopper combine to only 3 inches, thereby permitting the combine to be readily moved into and out of conventional tool sheds for servicing and repair.

FIGURES OF THE DRAWING

FIG. 1 is a perspective view illustrating the novel hopper extension device mounted on a conventional combine;

FIG. 2 is a fragmentary perspective view of a portion of the hopper extension device taken approximately along the line 2—2 of FIG. 1 and looking in the direction of the arrows;

FIG. 3 is a cross-sectional view of the hopper extension device illustrating the latter in a collapsed position;

DESCRIPTION OF THE PREFERRED EMBODIMENT

Figure 4:
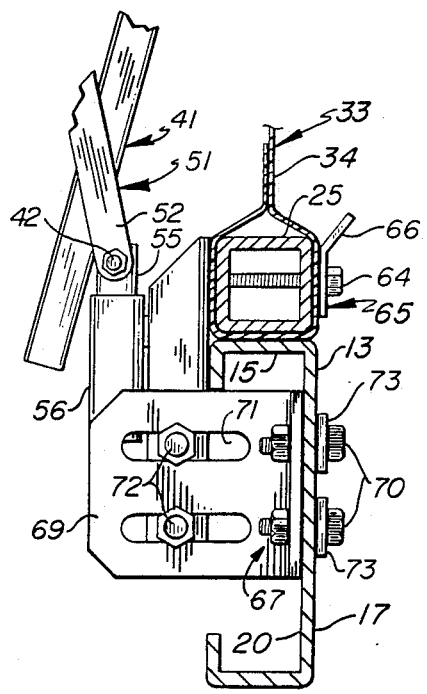
FIG. 4 is a cross-sectional view taken approximately along the line 4—4 of FIG. 2 and looking in the direction of the arrows.

Referring now to the drawings and, more specifically, to FIG. 1, it will be seen that one embodiment of my novel hopper extension device, designated generally by the reference numeral 10, is illustrated in mounted relation on a conventional combine 11.

The combine 11 is provided with a conventional hopper 12 of well-known construction. Most conventional combines have hoppers which are generally of rectangular or square configuration, and the rectangular-shaped hopper 12 includes opposed vertical side walls 13 and opposed vertical end walls 14. The side walls 13 each have an upper edge 15, while the end walls 14 each have an upper edge 16. Each side wall 13 has a substantially outer vertical planar surface 17 and an inner vertical planar surface 20. Each of the end walls has a vertical outer planar surface 18 and a vertical inner planar surface 19.

Since the combine hopper 12 is of generally rectangular configuration, the hopper attachment device is also of rectangular configuration. The hopper attachment device includes a rigid upper frame 21 and a rigid lower frame 22. The rigid upper frame 21 is comprised of tubular side frame members 23 and tubular end frame members 24. The lower frame 22 is comprised of tubular side frame members 25 and tubular end frame members 26. The side and end frame members of the upper and lower frames are of rectangular cross-sectional configuration, as best seen in FIG. 3.

Means are provided for interconnecting the side and end frame members of each of the frames together. For the upper frame member 23, this means includes exterior corner brackets 27, each of which is rigidly secured to adjacent end portions of a side and end frame member by bolt and nut assemblies 29. It will be noted that the nut and bolt assemblies 29 for each corner bracket 27 extend through the upper frame members and are rigidly secured to a pair of interior bracket plates 28. The frame members of the lower frame 22 are rigidly interconnected by exterior corner brackets 30 and are secured thereto by nut and bolt assemblies 29, which are connected to the interior bracket plates 31. It is pointed out that each of the upper corner brackets 27 is provided with an inwardly projecting flange 27a, which overlies the upper surface of the frame members of the upper frame.

The hopper attachment device 10 also includes a flexible wall structure 33 comprised of flexible side panels 34 and flexible end panels 35. In the embodiment shown, the flexible wall structure is formed from a single rectangular blank or panel of vinyl-coated nylon cord fabric, which is welded together at its end edges to give the flexible wall structure its rectangular configuration. The flexible wall structure includes upper sleeves 36 for the side panels and upper sleeves 37 for end panels. These upper sleeves 36 and 37 are of a size to receive the side frame members 23 and end frame members 24 of the upper frame 21 therein. The side panels 34 also have lower sleeves 38 at their respective lower ends and the end panels 35 also have lower sleeves 39 at their lower ends. The lower sleeves 38 and 39, respectively, receive the side frame members 25 and end frame members 26, respectively, of the lower frame. It will be appreciated that the sleeves are formed by folding the upper and lower edge portions of the panel blank and heat sealing or welding the folded over portions.

The hopper attachment device 10, when attached to the upper edge portion of a combine hopper, is shiftable between an extended or elevated position and a lower or collapsed position. Means are provided for shifting the hopper attachment device between extended and collapsed positions, and this means includes a plurality of similar toggle linkages or assemblies. 40. In the embodiment shown, a pair of toggle link assemblies 40 extend between and are connected to each side frame member of the upper frame and the side wall 20 of the combine hopper.

Figure 6:
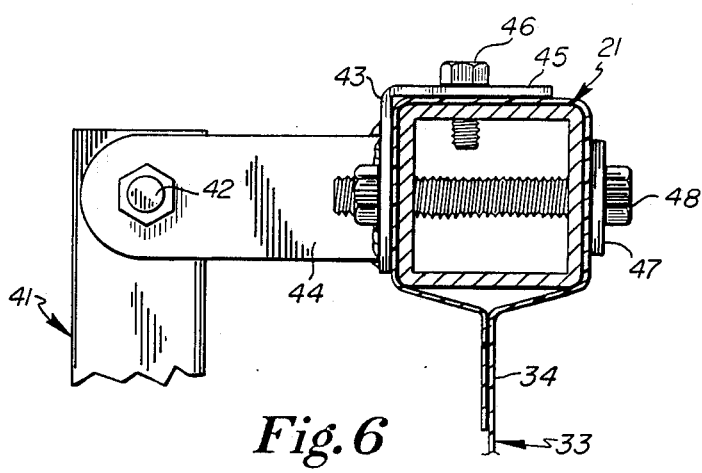
FIG. 6 is a cross-sectional view taken approximately along the line 6—6 of FIG. 2 and looking in the direction of the arrows.

Each toggle linkage 40 includes an elongate upper toggle link 41, which has its upper end pivotally connected to an upper bracket 43. The bracket 43 is provided with laterally spaced apart inwardly projecting ears 44, and the upper toggle link is positioned between and is pivotally connected to the ears by the pivot 42. In the embodiment shown, the upper link 41 for each toggle link assembly is formed of tubular stock and is of rectangular cross-sectional configuration. The upper bracket 43 for each toggle link assembly has an outturned flange 45, which overlies the upper surface of the associated side frame member 23, as best seen in FIG. 6. A suitable nut and bolt assembly 46 secures this outturned flange 45 to the associated side frame member 23. The bracket 43 for each toggle link assembly is also secured to a side frame member 23 and an external bracket plate 47 by suitable nut and bolt assemblies 48.

It will be noted that the upper link 41 is slightly bent at approximately the mid-portion thereof, so that each upper link presents a concave inner surface 49 and a convex outer surface 50. Each toggle link assembly 40 also includes a lower elongate toggle link member 51 comprised of a pair of laterally spaced apart link elements 52. The link elements 52 are positioned laterally outwardly of the upper toggle link 41 and are pivotally connected at their respective upper ends by a pivot 53 to the upper toggle link intermediate the ends of the latter. The lower end portion of each link element 52 is pivotally connected by a pivot 54 to the upper end portion of an elongate male socket member 55. It will be noted that the male socket member 55 is of tubular construction and is of rectangular cross-sectional configuration.

Figure 5:
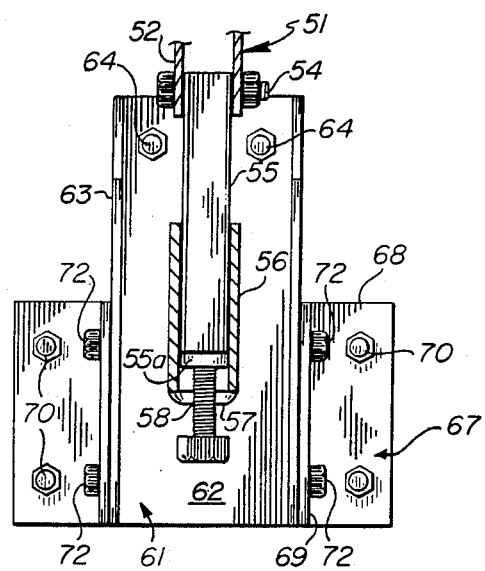
FIG. 5 is a fragmentary elevational view of a portion of the hopper extension device, with certain parts thereof broken away for clarity.

The male socket member 55 of each toggle link assembly is positioned within a vertically disposed female socket member 56, as best seen in FIG. 5. The female socket member 56 is rigidly secured to a lower bracket 61. The lower end 57 of the female socket member 56 has a threaded opening therein which is threadedly engaged by an elongate adjustment bolt 58. The adjustment bolt 58 may be adjusted longitudinally of the female socket member 56 and engages the lower end 55a of the male socket member 55 to vertically shift the latter and the upper toggle link and lower toggle link member 51 during installation of the hopper attachment device. This adjustment feature permits the hopper attachment device 10 to be attached to different model combines. It will be noted that the link elements 52 of the lower toggle link members 51 are formed of metal straps and each link element 52 is bent to define a concave outer edge surface 59 and a convex inner edge surface 60.

The lower bracket 61 is comprised of a flat substantially rectangular vertical bracket plate 62 having laterally spaced apart flat vertically disposed flanges 63 extending at right angles therefrom and inwardly thereof. The bracket 61 for each toggle link assembly is secured to one of the side frame members 25 of the lower frame 22 by nut and bolt assemblies 64. In the embodiment shown, the nut and bolt assemblies extend through the associated side frame member 25 of the lower frame and through an outer bracket plate 65 to secure the latter to the frame member 25. Referring now to FIG. 4, it will be noted that the outer bracket plate 65 has an outturned upper portion 66.

The lower bracket 61 for each toggle link assembly is secured to a pair of angle brackets 67, each including a flange 68 and a flange 69. The bracket 61 is positioned between and secured to the angle brackets 67. The flange 68 of each angle bracket 67 is provided with a pair of openings therethrough for accommodating nut and bolt assemblies 70. The nut and bolt assemblies 70 extend through the upper edge portion of the side walls 13 of the combine hopper and are secured to an external bracket plate 73 to rigidly secure the angle brackets to the combine hopper. It will also be noted that the flange 69 for each angle bracket is provided with a pair of elongate vertically spaced apart horizontal slots 71 therein. The slots 71 accommodate nut and bolt assemblies 72, which extend through openings in one of the flanges 63 of the lower bracket 61 to secure the lower bracket 61 to the angle brackets 67. The slots 71 permit each toggle link assembly to be adjusted relative to the combine hopper.

When the hopper attachment device 10 is attached to the hopper 12 of a combine 11, the angle brackets 67 rigidly secure each toggle link assembly 40 to the side walls of the combine hopper. The lower frame member 22 will be positioned upon the upper edges of the side and end walls of the hopper, so that the hopper attachment device 10 constitutes an upward extension of the combine hopper when the hopper attachment device is in the extended position.

When the hopper attachment device is in the erect or extended position, the toggle link assembly 41 will be vertically disposed, as illustrated in FIG. 2. It is pointed out that the pivot point 42 and pivot point 54 of each toggle link assembly are disposed in vertical alignment with each other. However, the pivot point 53 between the upper toggle link 41 and the lower toggle link member 51 will be disposed in an over-center position when each toggle link assembly is in the erect or vertically disposed position. This over-center relation locks the toggle link assemblies in the vertical extended position and does not require additional locking means, such as those used in the prior art. It will further be noted that the pivot points 42 and 54 for each toggle link assembly are spaced inwardly of the associated upper and lower frames of the hopper attachment device.

When it is desirable to shift the hopper attachment device to the collapsed position, the operator will raise the lower end of each upper toggle link 41 to thereby collapse each toggle link assembly to a horizontal position, as illustrated in FIG. 3. The side walls 34 and end walls 35 of the flexible wall structure 33 will be collapsed inwardly. In this regard, it will be noted that the collapsed side walls 34 of the flexible wall structure extend between the upper link 41 and lower link member 51 of each toggle link assembly without the attendant danger of the flexible wall structure being torn by a pinching action. This is possible because of the unique configuration of the upper toggle link and lower toggle link member of each toggle link assembly, as best seen in FIG. 3.

The hopper attachment device is preferably permanently attached to the hopper of a combine and will be extended to the erect position and used during the harvesting operation. In the embodiment shown, the hopper attachment device has a vertical dimension of approximately 2 feet in the extended condition to substantially increase the capacity of the combine hopper. However, when the hopper attachment device is collapsed, the vertical dimension of the attachment device is only approximately 3 inches. Therefore, when the hopper device is in the collapsed position, the combine may be easily driven into the conventional tool sheds without requiring removal of the hopper attachment device.

What is claimed is:

1. An adjustable hopper extension device for attachment to the hopper of a combine, the combine hopper having an open top and opposed vertical walls, said hopper extension device comprising:

similar upper and lower rectangular-shaped frames, each including opposed pairs of frame members, means rigidly interconnecting adjacent ends of the frame member of each of said frames, means securing the lower frame to the upper edge portion of the walls of the combine hopper, a flexible wall structure comprising opposed pairs of flexible vertical panels, each panel having an upper sleeve along its upper portion and a lower sleeve along its lower portion, each upper sleeve receiving a frame member of said upper frame therethrough, each lower sleeve receiving a frame member of said lower frame therethrough, means interconnecting the upper frame member with the combine hopper for shifting the hopper extension attachment between erect and collapsed positions, said means including a plurality of over-center toggle linkages, each comprising an elongate upper toggle link and an elongate lower toggle link, means pivotally interconnecting each upper toggle link with an upper frame member, means pivotally connecting each lower toggle link with the vertical wall of a combine hopper, pivot means interconnecting one end of the lower toggle link with the upper toggle link intermediate the ends of the latter, the toggle links of each toggle linkage being vertically disposed and releasably locked in an over-center condition when the hopper extension device is in the erect condition, whereby the upper frame is spaced above the lower frame and the vertical panels are taut, and the toggle links of each toggle linkage being disposed substantially horizontally when the hopper extension attachment is in the collapsed position to thereby position the upper frame upon the lower frame.

2. The adjustable hopper extension device as defined in claim 1 wherein the toggle links of each toggle linkage are shaped to define a space therebetween when the toggle links of each toggle linkage are in the collapsed horizontal position whereby the adjacent flexible panel of the flexible wall structure projects between the toggle links of a toggle linkage.

3. The adjustable hopper extension device as defined in claim 1 wherein said means interconnecting said upper toggle link of each toggle linkage with an upper frame member positions the axis of said upper toggle link in inwardly spaced relation with respect to the associated upper frame member, and said means interconnecting said lower toggle link of each toggle linkage with the combine hopper wall, positioning the pivotal axis of the lower toggle link in inwardly spaced relation with respect to the adjacent combine hopper wall.

4. The adjustable hopper extension device as defined in claim 1 wherein said means interconnecting each lower toggle link of each toggle linkage with a wall of a combine hopper includes an element connected to the combine hopper wall, and an element interconnected to the lower toggle link, said elements being adjustably interconnected to each other to permit horizontal lateral shifting of the lower toggle link of each toggle linkage relative to the associated wall of the combine hopper.

5. The adjustable hopper extension device as defined in claim 1 wherein said means pivotally connecting each lower toggle link with the vertical wall of a combine hopper is vertically adjustable to permit vertical translation of the lower toggle link of each toggle linkage.

6. The adjustable hopper extension device as defined in claim 5 wherein said means pivotally connecting each lower toggle link of a toggle linkage with the vertical wall of a combine hopper includes a male socket member pivotally connected to the lower toggle link and a female socket member connected to the wall of the combine hopper, adjustable means on said female socket member engaging the male socket member for shifting the latter vertically relative to the female socket member.

* * * * *